United States Patent Office 3,586,623
Patented June 22, 1971

---

3,586,623
PROCESS FOR DETOXIFICATION OF CYANIDE CONTAINING AQUEOUS SOLUTIONS
Rudolf G. Kuhn, Koppern, Germany, assignor to Deutsch Gold- und Silber-Scheideanstalt vormals Roessler, Frankfurt am Main, Germany
No Drawing. Filed Nov. 18, 1968, Ser. No. 776,755
Claims priority, application Germany, Jan. 12, 1968,
P 16 42 400.3
Int. Cl. C02c 5/04
U.S. Cl. 210—63
4 Claims

ABSTRACT OF THE DISCLOSURE

Aqueous cyanide solutions are detoxified by contacting them with air in the presence of a contact catalyst, preferably activated carbon.

---

Cyanides are employed to a large extent in the hardening industry for carburizing and in the galvano industry. Free cyanides are known to be highly toxic compounds and in the waste water, the detoxification must occur to a cyanide content of 0.1 mg./liter. The destruction, i.e. detoxification of the cyanides is successful in most cases through oxidation to cyanates and carbonates. As the oxidation agent, there is used principally chlorine gas and chlorine bleaching lye. High chemical costs occur and additionally there results an increased salt content of the waste water. Of less importance, on account of still higher costs, are electrolytic oxidation and the setting free of hydrocyanic acid in acid solution and the following combustion.

The present invention is based on the idea of oxidizing cyanides with atmospheric oxygen. While this is thermodynamicaly possible until now, it has not been accomplished because the reaction rate is practically nil.

It has now been found unexpectedly that the reaction between cyanides and atmospheric oxygen progresses quantitatively in the presence of certain catalysts. Particularly suited is activated carbon. There can also be used activated silicium dioxide, and other compounds with a huge surface.

If one passes a mixture of an aqueous cyanide solution in the alkaline region with atmospheric oxygen over columns filled with catalyst, then a method is evolved whereby the cyanide is destroyed in a very cheap manner without additional salting of the waste water.

The reaction is even more effective if the air and aqueous cyanide solution is pressed through the activated carbon filled column in a pulsating manner, whereby the probability is increased that the cyanide will reach the catalyst for the reaction.

The reaction is conveniently carried out at a temperature between room temperature and the boiling point of the solution.

The pH can be from 7 to 14, preferably 10 to 13. There can be employed any convenient water soluble alkaline material, e.g. sodium hydroxide, potassium hydroxide, sodium- or potassium carbonate (or cyanide only).

The cyanides are normally present as sodium or potassium cyanide in the alkaline mixture.

EXAMPLE 1

An aqueous cyanide solution containing 8 grams per liter of cyanide ion was adjusted to a pH of 11.7/11.8 employing 1 gram per liter of $Na_2CO_3$ sodium carbonate as the alkaline material. One liter of the solution was then brought to reaction with 200 liters of air by contacting the air with the solution while in engagement with a column filled with activated carbon. 98 to 99% of the cyanides added were oxidized, mostly to carbonate and also to cyanate.

EXAMPLE 2

An aqueous cyanide solution containing 1.5 grams of cyanide ion per liter was adjusted to a pH of 11.3 with 0.1 gram per liter of sodium carbonate ($Na_2CO_3$) as an alkaline material. One liter of the aqueous cyanide solution was mixed with 52 liters of air and reacted at room temperature for 11.5 hours in the presence of activated carbon. 99.99% of the cyanide was oxidized to cyanate and carbonate.

The reaciton can be carried out in continuous fashion, for example by passing the cyanide solution and air in countercurrent flow through a column filled with activated carbon.

What is claimed is:
1. A process for the detoxification of cyanide containing aqueous solution comprising mixing the solution with 52 to 200 volumes of air for each volume of solution, passing the mixture through a contact catalyst selected from the gorup consisting of activated carbon and activated silicon dioxide and thereby oxidizing the cyanide to cyanate and carbonate.
2. A process according to claim 1 wherein the aqueous solution is alkaline.
3. A process according to claim 2 wherein the catalyst is activated carbon.
4. A process according to claim 3 wherein the reaction is caried out between room temperature and the boiling point of the solution.

References Cited

UNITED STATES PATENTS

| | | | |
|---|---|---|---|
| 2,459,464 | 1/1949 | Smith | 210—63X |
| 3,275,547 | 9/1966 | Bucksteeg et al. | 210—39X |
| 1,323,239 | 12/1919 | Basore | 210—39X |
| 1,866,417 | 7/1932 | Mackert | 210—39X |

OTHER REFERENCES

Slater, J., Treament of Ammonical Liquor From Gasworks, The Suveyor, Feb. 5, 1932, P. 199 (P.O.S.L.).

Steel, E. W., Water Supply and Sewerage, 2d edit., McGraw-Hill, New York, pp. 468–469, 531 and 532 relied on.

Rudolfs, W., Industrial Wastes, 1953, Reinhold, New York, pp. 366–372, 385–389 and 411–413 relied on.

MICHAEL ROGERS, Primary Examiner

U.S. Cl. X.R.
23—75